United States Patent
Chou (10) Patent No.: US 10,534,187 B2
(45) Date of Patent: Jan. 14, 2020

(54) LIGHT PATH ADJUSTMENT MECHANISM

(71) Applicant: YOUNG OPTICS INC., Hsinchu (TW)

(72) Inventor: Tung-Hua Chou, Hsinchu (TW)

(73) Assignee: YOUNG OPTICS INC., Hsinchu (TW)

(*) Notice: Subject to any disclaimer, the term of this patent is extended or adjusted under 35 U.S.C. 154(b) by 0 days.

(21) Appl. No.: 16/177,056

(22) Filed: Oct. 31, 2018

(65) Prior Publication Data

US 2019/0346684 A1   Nov. 14, 2019

(30) Foreign Application Priority Data

May 11, 2018   (TW) .............................. 107116051 A (51) Int. Cl.
   *G02B 27/09*   (2006.01)
   *H01F 7/02*   (2006.01)
   *F21V 8/00*   (2006.01)

(52) U.S. Cl.
   CPC ....... *G02B 27/0977* (2013.01); *G02B 6/0031* (2013.01); *H01F 7/02* (2013.01)

(58) Field of Classification Search
   CPC .......................... G02B 27/0977; G02B 6/0031
   See application file for complete search history.

(56) References Cited

U.S. PATENT DOCUMENTS

| | | | |
|---|---|---|---|
| 6,198,565 B1 | 3/2001 | Iseki et al. | |
| 7,428,093 B2 | 9/2008 | Tegreene et al. | |
| 8,305,672 B2 | 11/2012 | Luanava et al. | |
| 2015/0198760 A1* | 7/2015 | Wilcox | G02B 6/0038 362/606 |
| 2016/0266299 A1* | 9/2016 | Yoon | G02F 1/1336 |

FOREIGN PATENT DOCUMENTS

TW    I275825 B    3/2007

* cited by examiner

*Primary Examiner* — Kevin Quarterman
(74) *Attorney, Agent, or Firm* — Muncy, Geissler, Olds & Lowe, P.C.

(57) ABSTRACT

A light path adjustment mechanism includes a carrier, an optical plate member, a support, a first axis, a second axis, a first actuator and a second actuator. The carrier includes an inner frame and an outer frame, the optical plate member is disposed on the inner frame and has a reflective surface and an opposite surface opposite the reflective surface. The first axis is disposed between the inner frame and the outer frame, and the second axis is disposed between the outer frame and the support. The first actuator and the second actuator are disposed on one side of the carrier facing away from the reflective mirror, and the opposite surface of the reflective mirror and the first axis are spaced at a distance.

20 Claims, 10 Drawing Sheets

LIGHT PATH ADJUSTMENT MECHANISM

BACKGROUND OF THE INVENTION a. Field of the Invention

The invention relates generally to an optical mechanism, and more particularly to an light path adjustment mechanism b. Description of the Related Art

Nowadays, various image display technologies are widely used in daily life. In order to increase the resolution and picture quality of an image display device, a light path adjustment mechanism can be used to adjust propagation paths of light in the image display device to shift pixel images and thereby increase addressability. However, the number of components, weight and occupied space of a conventional light path adjustment mechanism is considerably large, and thus the entire mechanism is difficult to be miniaturized. Therefore, it is desirable to provide a simple, reliable, light and compact design of a light path adjustment mechanism.

BRIEF SUMMARY OF THE INVENTION

According to one aspect of the present disclosure, a light path adjustment mechanism includes a carrier, reflective mirror, a first coil, a second coil, a third coil, a fourth coil, a support, a first pair of elastic members and a second pair of elastic member. The carrier includes an inner frame and an outer frame disposed outside the inner frame, and the carrier has a first side and a second side opposite the first side. The reflective minor is disposed on the first side of the carrier, and the first coil, the second coil, the third coil and the fourth coil are disposed on the second side of the carrier. The support is provided with at least two attachment points, and the carrier are attached to the support through the attachment points. The first pair of elastic members connects the inner frame with the outer frame and defines a first axis, and a second pair of elastic members connects the outer frame with the support and defines a second axis. The reflective minor covers the first side of the carrier in an overlapping area, a corresponding area on the second side of the carrier coincides with the overlapping area, and the first coil and the second coil are disposed inside the corresponding area.

According to the above aspect, at least part of the actuator can be disposed overlapping the carrier to reduce occupied space, weight and component number, thereby realizing a slim and compact light path adjustment mechanism. Besides, the light beam incident to the optical plate member is reflected by but not pass the optical plate member, and thus at least one component (such as the coils) may be hidden under the optical plate member (overlapping an effective reflection area of the optical plate member) without affecting light propagation to further reduce the occupied space of a light path adjustment mechanism.

According to another aspect of the present disclosure, a light path adjustment mechanism includes a carrier, an optical plate member, a support, a first axis, a second axis, a first actuator and a second actuator. The carrier includes an inner frame and an outer frame disposed outside the inner frame, the optical plate member is disposed on the inner frame and has a reflective surface and an opposite surface opposite the reflective surface, and the support is disposed outside the outer frame. The first axis is disposed between the inner frame and the outer frame, and the second axis is disposed between the outer frame and the support. The first actuator and the second actuator are disposed on one side of the carrier facing away from the reflective mirror, and the opposite surface of the reflective mirror is spaced at a distance from the first axis to allow the reflective surface of the reflective mirror to tilt about the first axis.

According to the above aspect, at least part of the actuator can be disposed overlapping the carrier to reduce occupied space, weight and component number, thereby realizing a slim and compact light path adjustment mechanism. Besides, the distance forming between the opposite surface and the first axis is relied upon to provide a room for titling the optical plate member and thus preventing the moving optical plate member from being blocked by the outer frame or other component.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.).

The following description relates in general to a light path adjustment mechanism used with an optical system (e.g., a display device or a projector) to modify or change light paths to enhance perceived image resolution, improve picture quality (e.g., eliminating dark regions or blurring image edges), or provide other beneficial effects. Further, it should be understood that the light path adjustment mechanism is not limited to a specific arrangement and location in the optical system.

Figure 1:
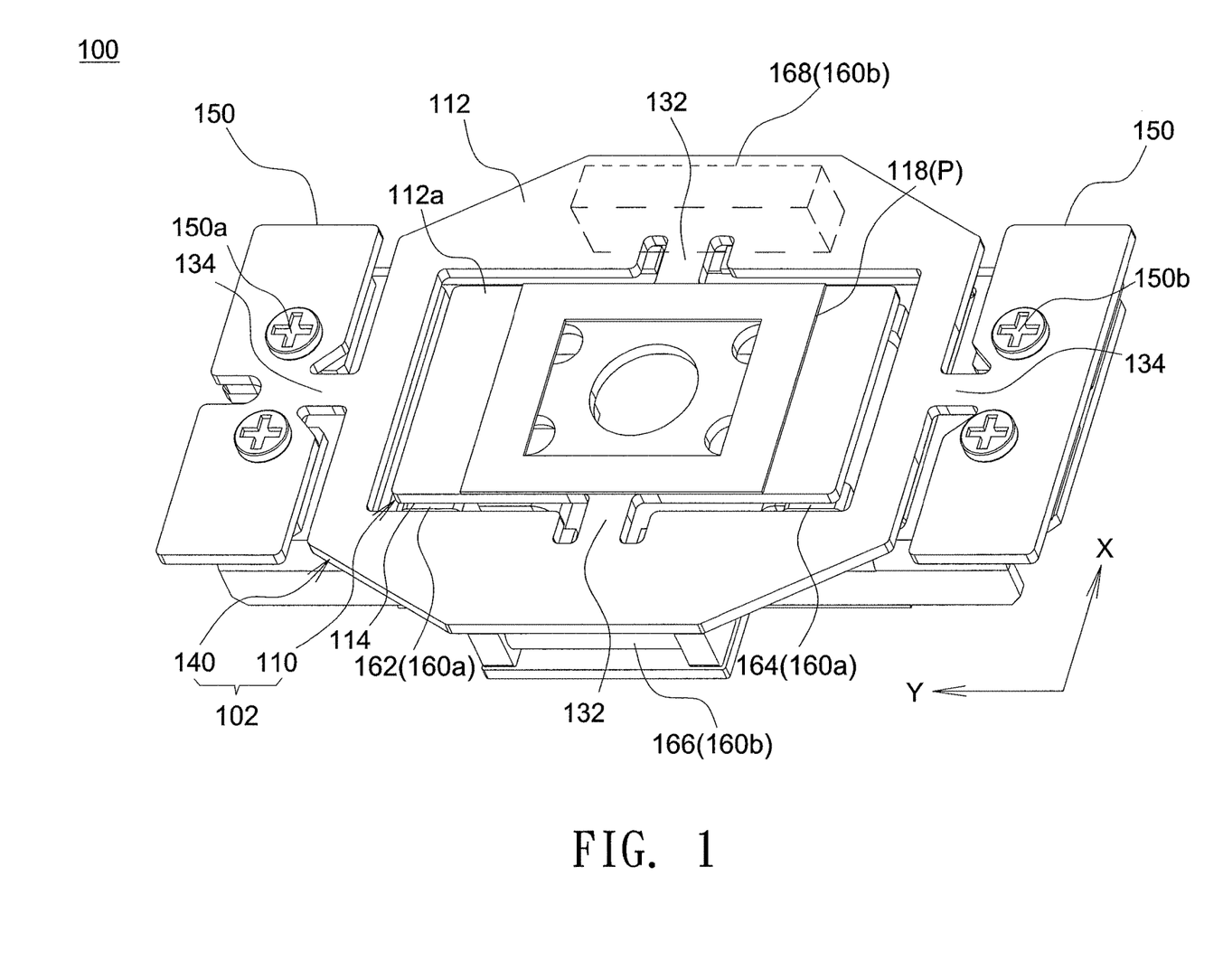
FIGS. 1 and 2 respectively show schematic diagrams of a light path adjustment mechanism without or with an optical plate member according to an embodiment of the invention.
Figure 2:
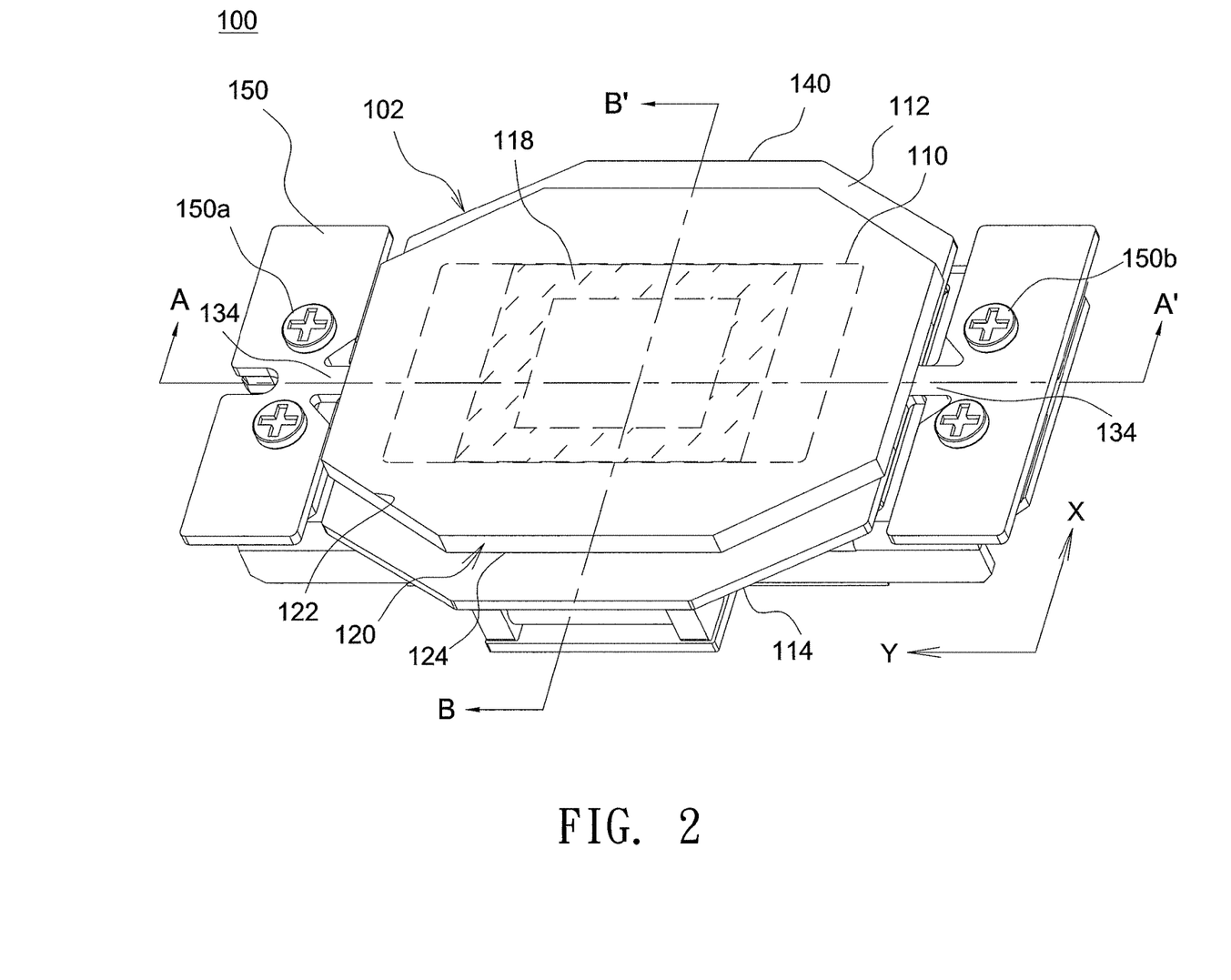

FIGS. 1 and 2 show schematic diagrams of a light path adjustment mechanism according to an embodiment of the invention, where FIG. 1 does not depict an optical plate member to reveal details under the optical plate member. With reference to FIG. 1, a light path adjustment mechanism 100 includes a carrier 102, a first pair of elastic members 132, a second pair of elastic members 134 and a support 150, and the carrier 102 includes an inner frame 110 and an outer frame 140. The inner frame 110 and the outer frame 140 may be located at the same height or may lie in the same plane, and the outer frame 140 may surround the inner frame 110. In this embodiment, the first pair of elastic members 132 connects the inner frame 110 with the outer frame 140, and the second pair of elastic members 134 connects the outer frame 140 with the support 150. Therefore, the first pair of elastic members 132 define a first axis, and the second pair of elastic members 134 define a second axis different to the first axis. In this embodiment, as shown in FIG. 1, the first axis is parallel to the X-axis direction, and the second axis is parallel to the Y-axis direction. Further, the light path adjustment mechanism 100 may include a first actuator 160a and a second actuator 160b. In this embodiment, the first actuator 160a includes a first coil 162 and a second coil 164, and the second actuator 160b includes a third coil 166 and a fourth coil 168. The carrier 102 has a first side (such as a top side 112) and a second side (such as a bottom side 114) opposite the first side. The coils 162, 164, 166 and 168 are disposed on the same side (such as the bottom side 114) of the carrier 102. Further, a spacer 118 is disposed on the inner frame 110, and the spacer 118 is not limited to a specific structure or configuration. In this embodiment, the spacer 118 is a hollow rectangular-shaped pad attached to a top surface 112a of the inner frame 110, but the invention is not limited thereto. In other embodiment, the spacer 118 may be in the faun of an adhesive. It should be noted that the area or position of the spacer 118 (such as a pad or an adhesive) may vary without any limitation.

As shown in FIG. 2, an optical plate member 120 is disposed on one side (such as the top side 112) of the carrier 102. The optical plate member 120 is not limited to a specific form or structure, so long as it may change, at least to some extent, the traveling direction of incoming light beams. In this embodiment, the optical plate member 120 is a reflective mirror. The support 150 may be provided with at least two attachment points 150a and 150b. In this embodiment, the carrier 102 is connected to the attachment points 150a and 150b of the support 150 through fasteners such as screws or pins to be fixed on the support 150.

Figure 3:
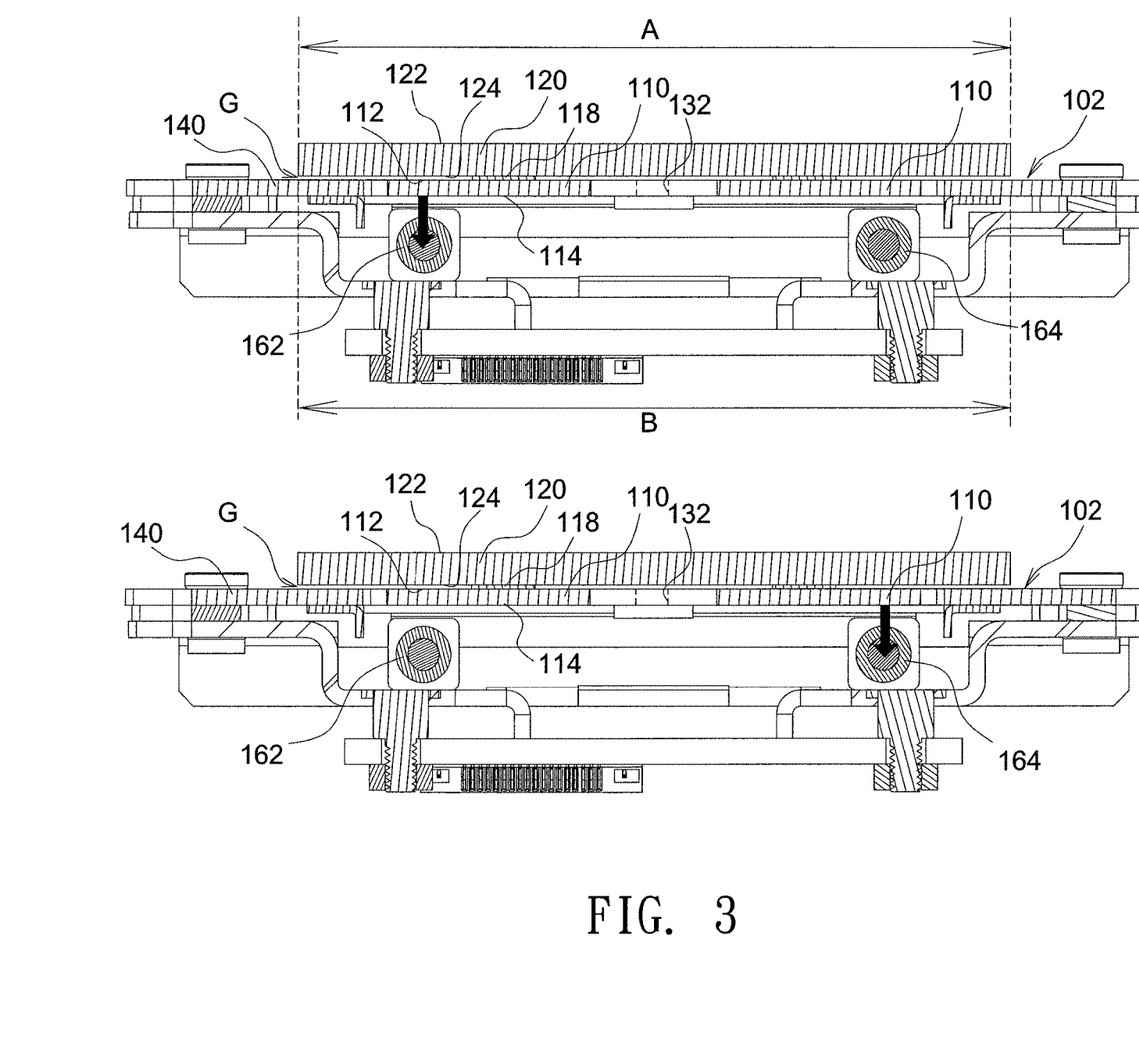
FIG. 3 shows a cross-sectional view cut along line A-A' of FIG. 2.
Figure 4:
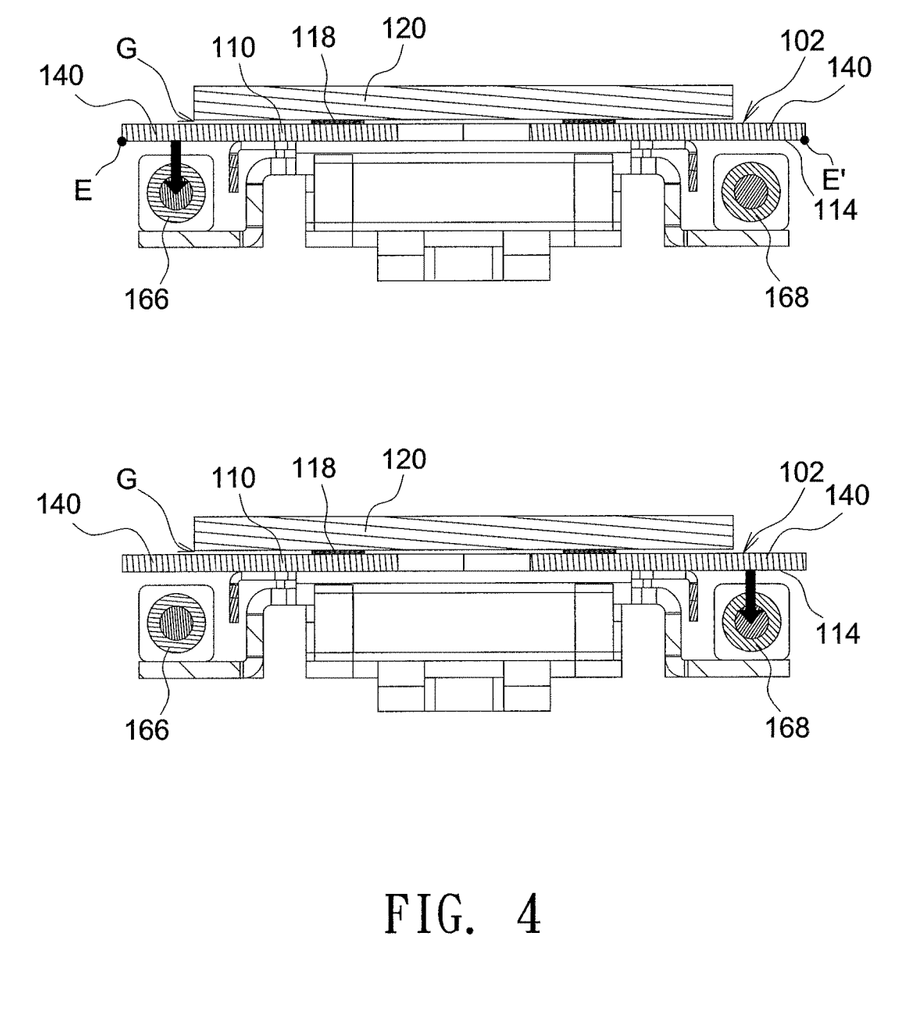
FIG. 4 shows a cross-sectional view cut along line B-B' of FIG. 2.

FIG. 3 shows a cross-sectional view cut along line A-A' of FIG. 2, and FIG. 4 shows a cross-sectional view cut along line B-B' of FIG. 2. Referring to both FIG. 3 and FIG. 4, the optical plate member 120 is disposed on the top side 112 of the carrier 102, and the first coil 162, the second coil 164, the third coil 166 and the fourth coil 168 are disposed on the bottom side 114 of the carrier 102 facing away from the optical plate member 120. In this embodiment, the first coil 162 and the second coil 164 are disposed on two opposite sides of the first pair of elastic members 132 and under the inner frame 110, and the third coil 166 and the fourth coil 168 are disposed on two opposite sides of the second pair of elastic members 134 and under the outer frame 140. The optical plate member 120 covers the top side 112 of the carrier 102 in an overlapping area A, a corresponding area B on the bottom side 114 of the carrier 102 coincides with the overlapping area A, and the first coil 162 and the second coil 164 are disposed inside the corresponding area B. Therefore, in one embodiment, at least the first coil 162 and the second coil 164 may overlap an effective reflection area of the optical plate member 120. Further, in this embodiment, the optical plate member 120 is a reflective mirror and has a reflective surface 122 and an opposite surface 124 opposite the reflective surface 122. The spacer 118 is disposed between the inner frame 110 and the optical plate member 120 to create a gap between the opposite surface 124 of the optical plate member 120 and the top side 112 of the inner frame 110, such that the opposite surface 124 is spaced at a distance G from the first pair of elastic members 132 (first axis). This allows for a room for the optical plate member 120 to tilt about a particular axial direction. For example, the reflective surface 122 of the optical plate member 120 is allowed to tilt about the first axis defined by the first pair of elastic members 132 and/or to tilt about the second axis defined by the second pair of elastic members 134 to various positions. The spacer 118 is not limited to a specific structure or shape, so long as an appropriate distance G is provided.

As shown in the top figure of FIG. 3, when the coil 162 is energized, an attractive force is generated to attract the inner frame 110, which causes one end of the inner frame 110 (such as the left end) to move downwardly. Then, as shown in the bottom figure of FIG. 3, when the coil 164 is energized, an attractive force is generated to attract the inner frame 110, which causes another end of the inner frame 110 (such as the right end) to move downwardly. Therefore, the coil 162 and the coil 164 are alternately energized to cause the inner frame 110 with the optical plate member 120 to tilt about the first axis (e.g., X-axis direction) defined by the first pair of elastic members 132 shown in FIG. 1. Similarly, as shown in the top figure of FIG. 4, when the coil 166 is energized, an attractive force is generated to attract the outer frame 140 and thus cause one end of the outer frame 140 to move downwardly; in comparison, as shown in the bottom figure of FIG. 4, when the coil 168 is energized, an attractive force is generated to attract the outer frame 140 and thus cause another end of the outer frame 140 to move downwardly. Therefore, the coil 166 and the coil 168 are alternately energized to cause two ends of the outer frame 140 to alternately move downwardly, which enables the outer frame 140 with the optical plate member 120 to tilt about the second axis (e.g., Y-axis direction) defined by the second pair of elastic members 134 shown in FIG. 1. Therefore, the optical plate member 120 may tilt about two different axes to reach various positions within an angular range to reflect incoming light beams, which may cause a change in the traveling direction and propagation path of incoming light beams. In this embodiment, the distance G is relied upon to provide a room for titling the optical plate member 120 and thus preventing the moving optical plate member 120 from being blocked by the outer frame 140 or other component. In other embodiment, the spacer 118 and the formation of the distance G can be omitted through proper arrangements that can eliminate possible obstruction to the motion of the optical plate member 120. According to the above embodiments, the light path adjustment mechanism is allowed to modify or change light paths to provide beneficial effects according to actual demands, and these beneficial effects may include, but are not limited to, enhancing perceived image resolution and improving picture quality (e.g., eliminating dark regions or blurring image edges).

In one embodiment, the actuators may cause the optical plate member 120 to tilt at an angle on the order of larger than 0.001 degree, and this may correspond to a vertical movement of larger than 0.1 um at the outer perimeter (such as the end point E or E') of the optical plate member 120.

In one embodiment, the carrier 102, the first pair of elastic members 132 and the second pair of elastic members 134 are integrally formed at least in part to reduce the component number, structure complexity and assembly time. In one embodiment, the outer frame 140, the inner frame 110, the first pair of elastic members 132 and the second pair of elastic members 134 may be all integrally formed as one piece using the same material (such as magnetic substance). Alternatively, two or three of them may be integrally formed as one piece and are then combined with the remainder. For example, the outer frame 140 may be integrally formed as one piece with the first pair of elastic members 132 and the second pair of elastic members 134 using the same material (such as magnetic substance), or the outer frame 140 may be integrally formed as one piece with the first pair of elastic members 132 using the same material (such as magnetic substance), but the invention is not limited thereto.

According to the above embodiments, in case the optical plate member 120 is a reflective mirror, the light beam incident to the optical plate member 120 is reflected by but not pass the optical plate member 120, and thus at least one component (such as the coils 162 and 164) may be hidden under the optical plate member 120 (overlapping an effective reflection area of the optical plate member 120) without affecting light propagation to further reduce the occupied space of a light path adjustment mechanism.

Figure 5:
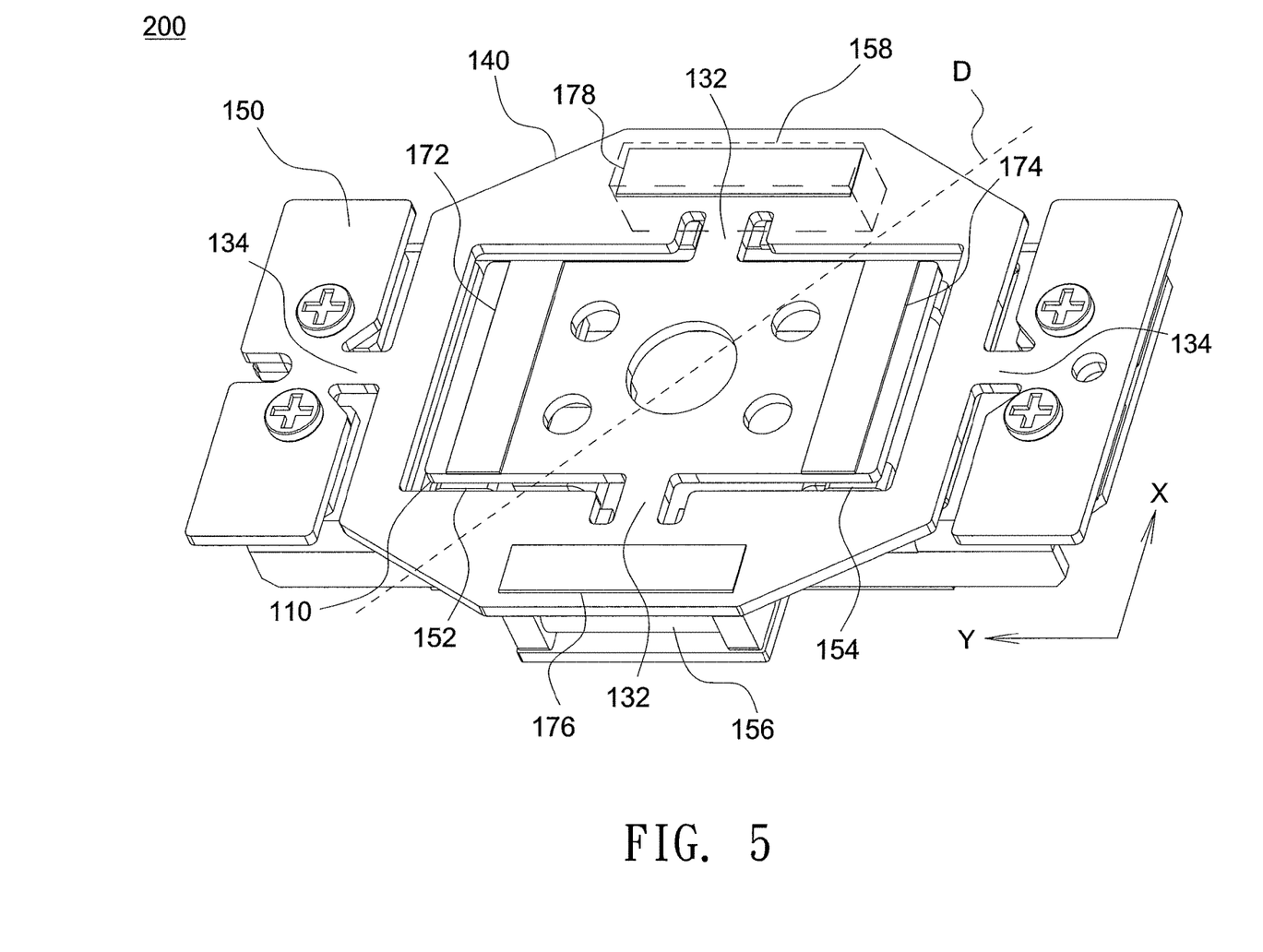
FIG. 5 shows a schematic diagram of a light path adjustment mechanism according to another embodiment of the invention.
Figure 6A:
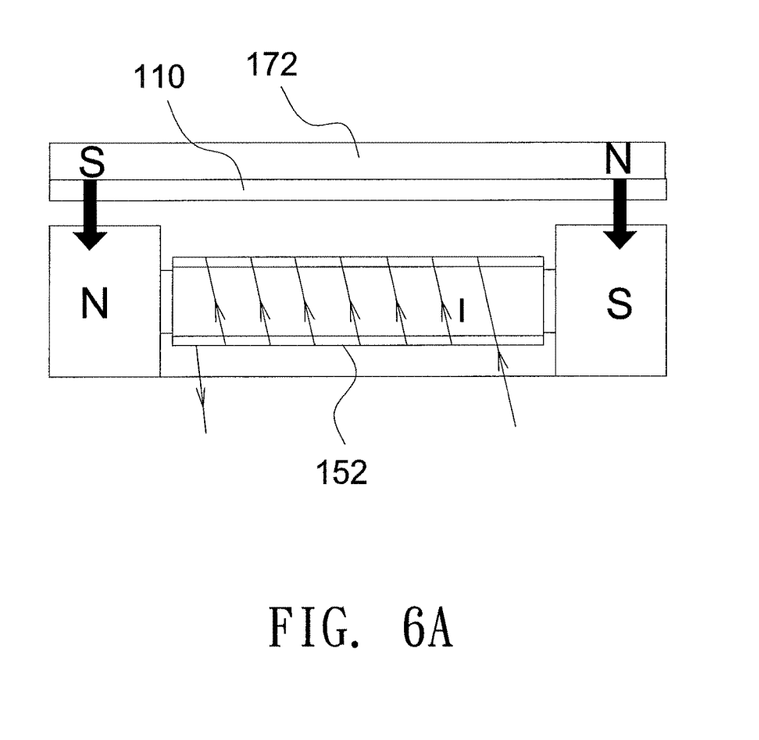
FIGS. 6A, 6B, 7A and 7B show schematic diagrams illustrating magnetic interaction of an actuator according to another embodiment of the invention.
Figure 6B:
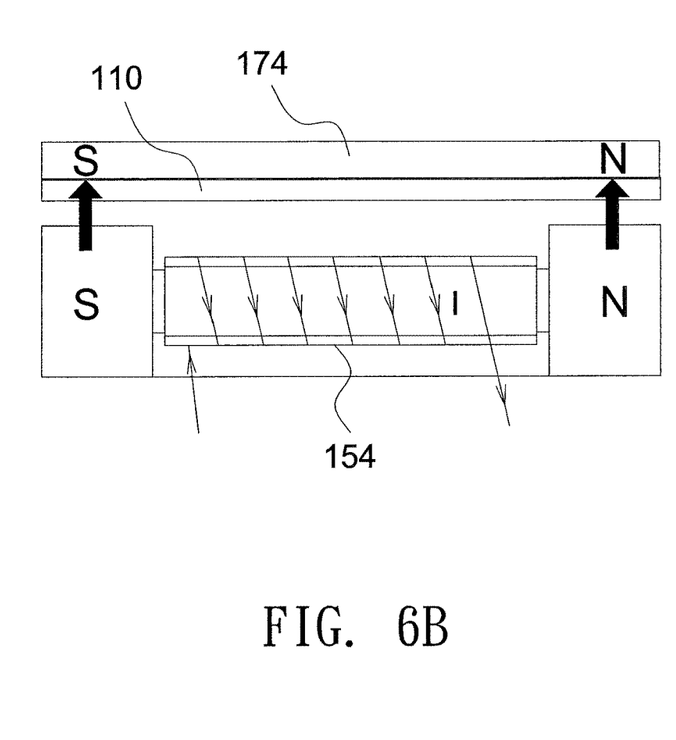
Figure 7A:
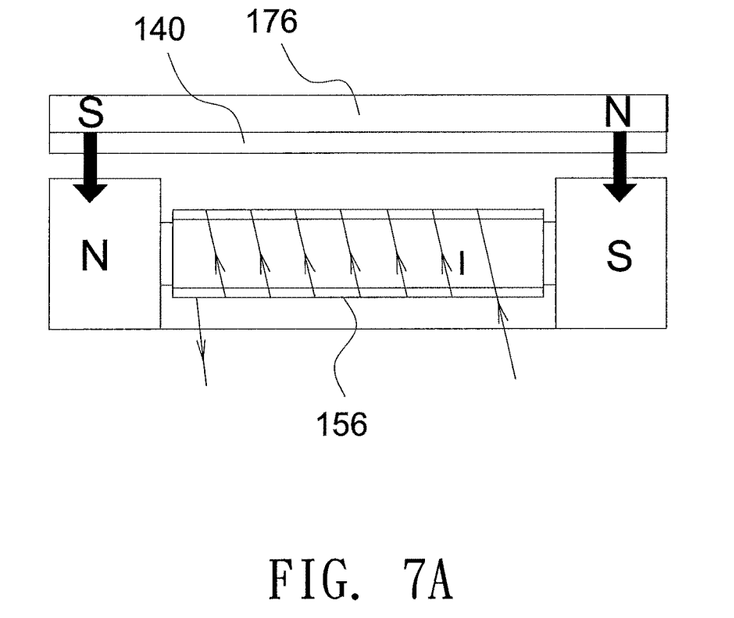
Figure 7B:
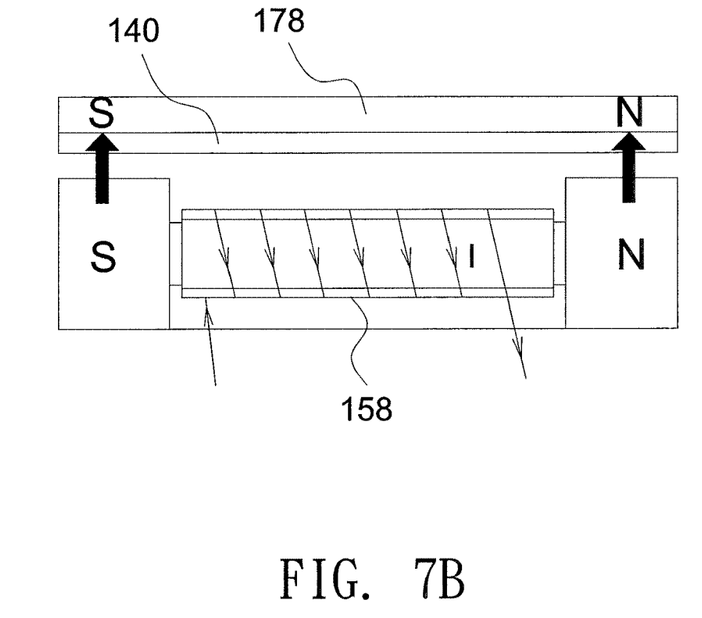

FIG. 5 shows a schematic diagram of a light path adjustment mechanism according to another embodiment of the invention. With reference to FIG. 5, a first actuator of a light path adjustment mechanism 200 may include electromagnets 152 and 154 disposed under the inner frame 110 and permanent magnets 172 and 174 disposed on the inner frame 110 and respectively correspond to the electromagnets 152 and 154. Besides, a second actuator of the light path adjustment mechanism 200 may include electromagnets 156 and 158 disposed under the outer frame 140 and permanent magnets 176 and 178 disposed on the outer frame 140 and respectively correspond to the electromagnets 156 and 158. Further, in this embodiment, the outer frame 140, the inner frame 110, the first pair of elastic members 132 and the second pair of elastic members 134 are all made from a non-magnetic material or different non-magnetic materials. It should be noted that each actuator is not limited to such arrangement and may vary according to actual demands. Herein, the term "permanent magnet" refers to an object made from any material that is magnetized and can create its own persistent magnetic field. In one embodiment, the electromagnet may include a core and a coil winding around the core. In other embodiment, the permanent magnet or the electromagnet may be replaced with an air core coil. As shown in FIG. 6A, in one embodiment, the permanent magnet 172 is disposed on the inner frame 110 and has a south pole S (on the left side) and a north pole N (on the right side), and the electromagnet 152 has a north pole N (on the left side) and a south pole S (on the right side) to attract the permanent magnet 172 and cause one end of the inner frame 110 to move downwardly. In comparison, as shown in FIG. 6B, the permanent magnet 174 is disposed on the inner frame 110 and has a south pole S (on the left side) and a north pole N (on the right side), and the electromagnet 154 has a south pole S (on the left side) and a north pole N (on the right side) to repel the permanent magnet 174 and cause another end of the inner frame 110 to move upwardly. Then, each of the electromagnet 152 and the electromagnet 154 reverses the flow direction of a current I and exchanges magnetic polarities to cause the inner frame 110 to tilt in an opposite direction. Therefore, the alternating attraction and repulsion causes the inner frame 110 with the optical plate member 120 to tilt about the first axis (e.g., X-axis direction) defined by the first pair of elastic members 132. Further, as shown in FIG. 7A, the permanent magnet 176 is disposed on the outer frame 140 and has a south pole S (on the left side) and a north pole N (on the right side), and the electromagnet 156 has a north pole N (on the left side) and a south pole S (on the right side) to attract the permanent magnet 176 and cause one end of the outer frame 140 to move downwardly. In comparison, as shown in FIG. 7B, the permanent magnet 178 is disposed on the outer frame 140 and has a south pole S (on the left side) and a north pole N (on the right side), and the electromagnet 158 has a south pole S (on the left side) and a north pole N (on the right side) to repel the permanent magnet 178 and cause another end of the outer frame 140 to move upwardly. Then, each of the electromagnet 156 and the electromagnet 158 reverses the flow direction of a current I and exchanges magnetic polarities to cause the outer frame 140 to tilt in an opposite direction. Therefore, the alternating attraction and repulsion causes the outer frame 140 with the optical plate member 120 to tilt about the second axis (e.g., Y-axis direction) defined by the second pair of elastic members 134. As a result, the optical plate member 120 may tilt about two different axes to reach various positions within an angular range to reflect incoming light beams, which may cause a change in the traveling direction and propagation path of incoming light beams. Further, the permanent magnets 172 and 174 may also serve as spacers. When the optical plate member 120 is disposed on the inner frame 110, the permanent magnets 172 and 174 separate the optical plate member 120 and the inner frame 110 to create the distance G and thus leave the room for tilting the optical plate member 120. Further, an actuator that generates both attractive and repulsive forces for tilting the optical plate member 120 may achieve a greater degree of vibration. Therefore, even the actuator is disposed on only one side of the first axis (the first pair of elastic members 132) and only one side of the second axis (the second pair of elastic members 134), a sufficient angular range of rotation can be still provided. For example, in other embodiment, the electromagnets 154 and 156 and the corresponding permanent magnets 174 and 176 can be omitted. The light path adjustment mechanism 200 may use only the electromagnet 152 to alternately attract and repel the permanent magnet 172 to enable the inner frame 110 with the optical plate member 120 to tilt about the first axis, and use only the electromagnet 158 to alternately attract and repel the permanent magnet 178 to enable the outer frame 140 with the optical plate member 120 to tilt about the second axis. This may similarly allow the optical plate member 120 to tilt about two different axes to reach various positions. The arrangement of removing the electromagnets 154 and 156 and the permanent magnets 174 and 176 may further reduce occupied space, weight and fabrication costs. In other embodiment, the electromagnet 154 and the corresponding permanent magnet 174 may be replaced by a first spring, and/or the electromagnet 156 and the corresponding permanent magnet 176 may be replaced by a second spring. Moreover, in other embodiment, a diagonal line D may divide the light path adjustment mechanism 200 into an upper-left part and a lower-right part as shown in FIG. 5, and the lower-right part without the electromagnet 154 and 156 and the permanent magnets 174 and 176 may be entirely removed to further reduce occupied space, weight and fabrication costs.

In one embodiment, the natural frequency of the carrier may be adjusted by changing pin weight or screw weight, adding a mass block or providing a pressure plate to avoid resonance vibrations. It is also noted that a higher natural frequency may increase the response speed of the carrier and may achieve a desired angular range of rotation by a smaller actuator.

Figure 8:
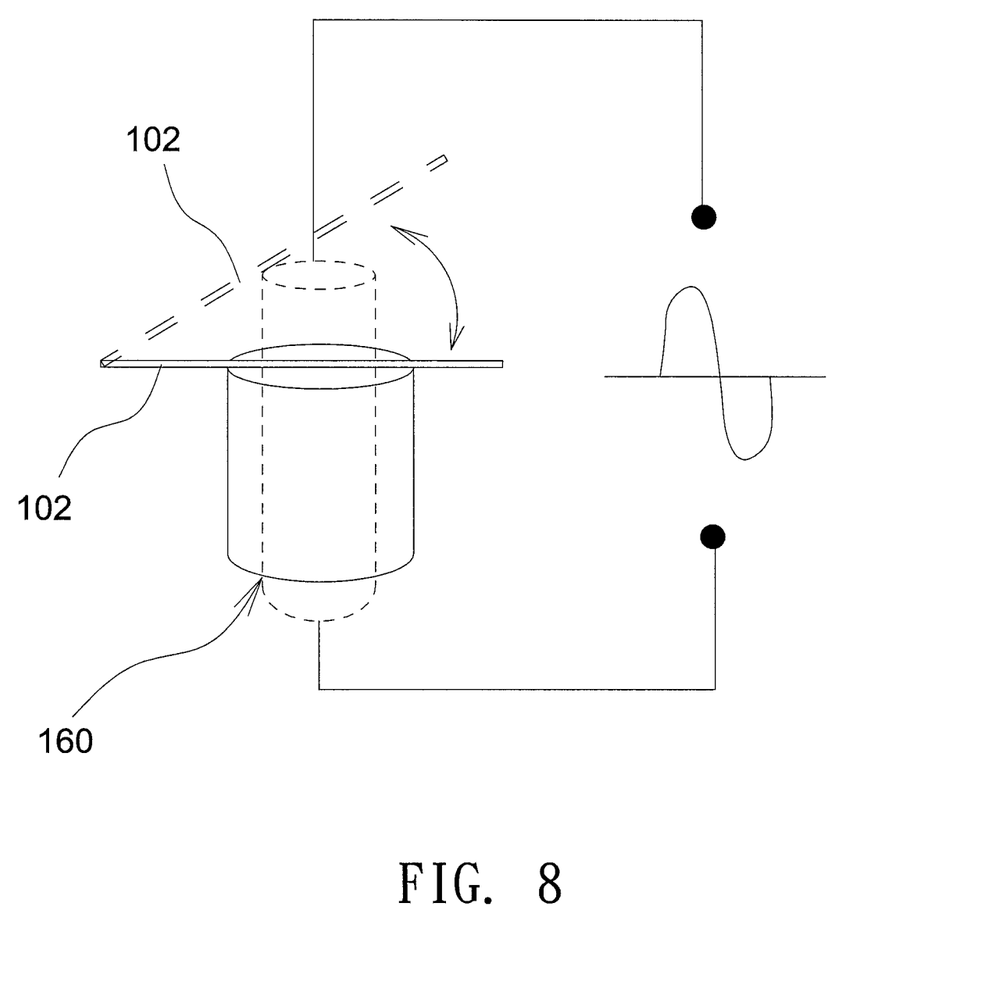
FIG. 8 shows a schematic diagram of an actuator according to another embodiment of the invention.

In other embodiment, as shown in FIG. 8, the actuator may include a piezoelectric element 160 disposed on the carrier 102. The piezoelectric element 160 may deform and change in shape when an electric field is applied, converting electrical energy into mechanical energy, to cause reciprocate movement of the carrier 102.

Figure 9:
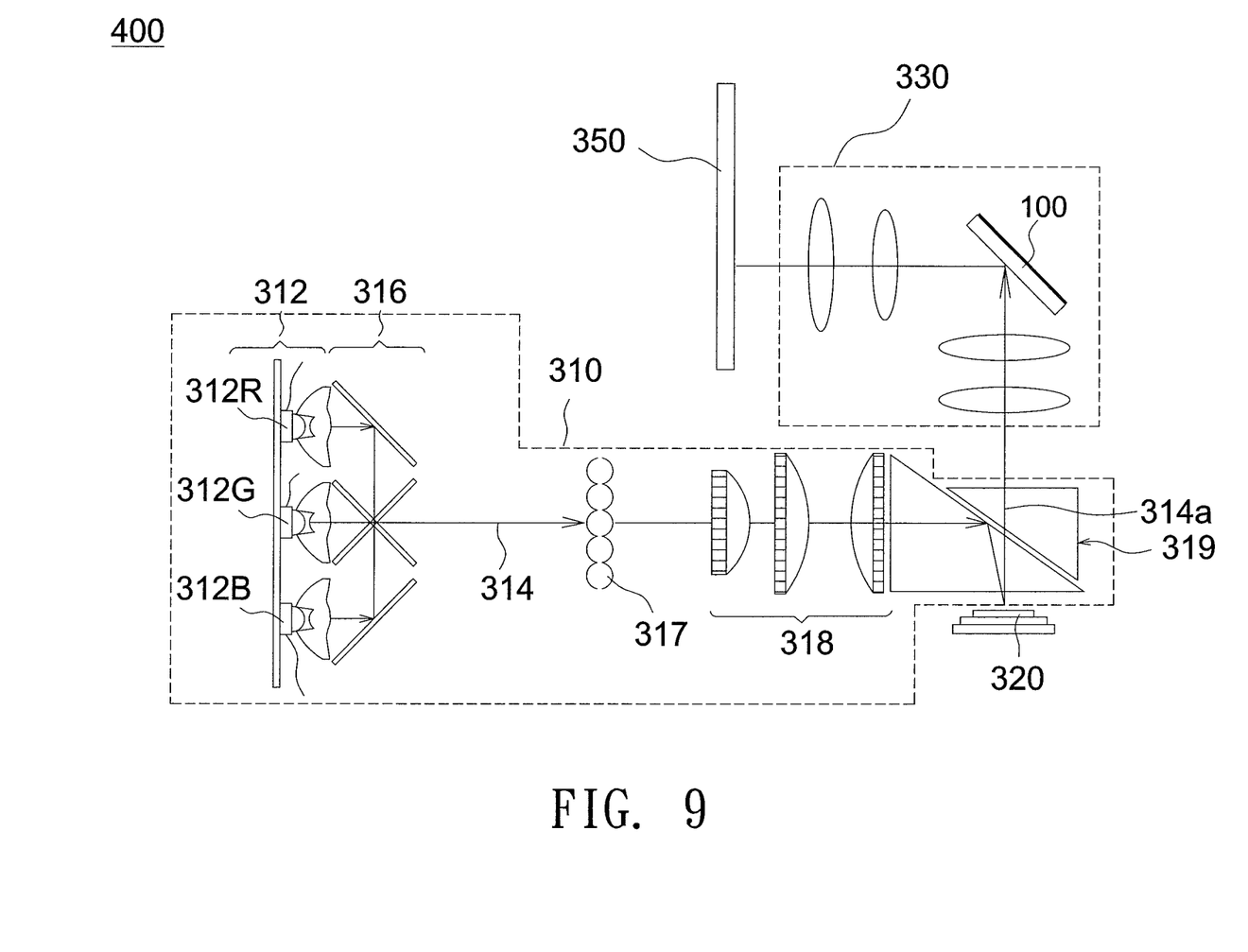
FIG. 9 shows a schematic diagram of a light path adjustment mechanism used in a projector according to an embodiment of the invention.

FIG. 9 shows a schematic diagram of a light path adjustment mechanism used in a projector according to an embodiment of the invention. Referring to FIG. 9, a projector 400 includes an illumination system 310, a light valve 320, a projection lens 330 and a light path adjustment mechanism 100. The illumination system 310 has a light source 312 for providing a light beam 314, and the light valve 320 is disposed in a propagation path of the light beam 314 and converts the light beam 314 into multiple sub images 314a. Besides, the projection lens 330 is disposed in a propagation path of the sub images 314a, and the light valve 320 is disposed between the illumination system 310 and the projection lens 330. Further, the light path adjustment mechanism 100 may be disposed in the projection lens 330. The light source 312 may, for example, include a red LED 312R, a green LED 312G and a blue LED 312B. Light from each of the LEDs 312R, 312G and 312B are combined by a light combiner 316 to form the light beam 314, and the light beam 314 passes a fly-eye lens array 317, a lens assembly 318 and the TIR Prism 319 in succession. Then, the light beam 314 is reflected by the TIR Prism 319, directed to the light valve 320, and converted into multiple sub images 314a by the light valve 320. The sub images 314a pass the TIR Prism 319 and are projected on a screen 350 by the projection lens 330. In this embodiment, when the sub images 314a reach the light path adjustment mechanism 100, the light path adjustment mechanism 100 may reflect the sub images 314a and alter the propagation path of the sub images 314a. Therefore, at a first time point the sub images 314a are projected on a first position (not shown) of the screen 350 by the light path adjustment mechanism 100, at a second time point the sub images 314a are projected on a second position (not shown) of the screen 350 by the light path adjustment mechanism 100, and the second position is away from the first position for a distance in a horizontal direction and/or a vertical direction. In this embodiment, the light path adjustment mechanism 100 is allowed to horizontally and/or vertically shift the position of the sub images 314a for a distance to therefore improve horizontally and/or vertically image resolutions. Although the light path adjustment mechanism is described herein as being applied to the projector 400, in other embodiments, the light path adjustment mechanism can be applied to different optical systems to achieve different effects without limitation. Besides, the arrangement and position of the light path adjustment mechanism in an optical system is not restricted.

According to the above embodiments, the elastic member, which is deformed when a load is applied thereon and returns to its original shape and size when the load is removed, may be made from plastic or metal without limitation. For example, the elastic member may be a spring or a flexible bar. Further, the support is simply used for defining an accommodation space and may have any shape or design without limitation.

The term "light valve", which is commonly known in the projector industry, refers to individually-addressed optical units of a spatial light modulator. The spatial light modulator includes multiple individually-addressed optical units arranged as a one-dimensional or a two-dimensional array. Each optical unit can be individually addressed by optical or electrical signals to alter its optical properties through various physical effects (e.g., Pockels effect, Kerr effect, photoacoustic effect, pagneto-optic effect, self electro-optic effect or photorefractive effect). Therefore, the multiple individually addressed optical units may modify incoming light beams and output image beams. The optical units may be, for example, micro mirrors or liquid crystal cells, and the light valve may be a digital micro-mirror device (DMD), a liquid-crystal-on-silicon panel (LCOS panel) or a transmissive type LCD panel.

A projector is an apparatus capable of casting an image on a screen through optical projection. In the projector industry, a variety of different types of projectors, which are distinguished from each other by the type of a light valve, may include a cathode-ray-tube type, a liquid-crystal-display (LCD) type, a digital-light-projector (DLP) type or a liquid-crystal-on-silicon (LCOS) type. An LCD-type projector that uses an LCD as a light valve is a transmissive type projector. A DLP-type projector using digital micro-mirror devices as a light valve and an LCOS-type projector using liquid crystal on silicon as a light valve are reflective type projectors that project images through light reflection. In this embodiment, the projector is a DLP-type projector and the light valve 320 is a digital micro-minor device.

Figure 10:
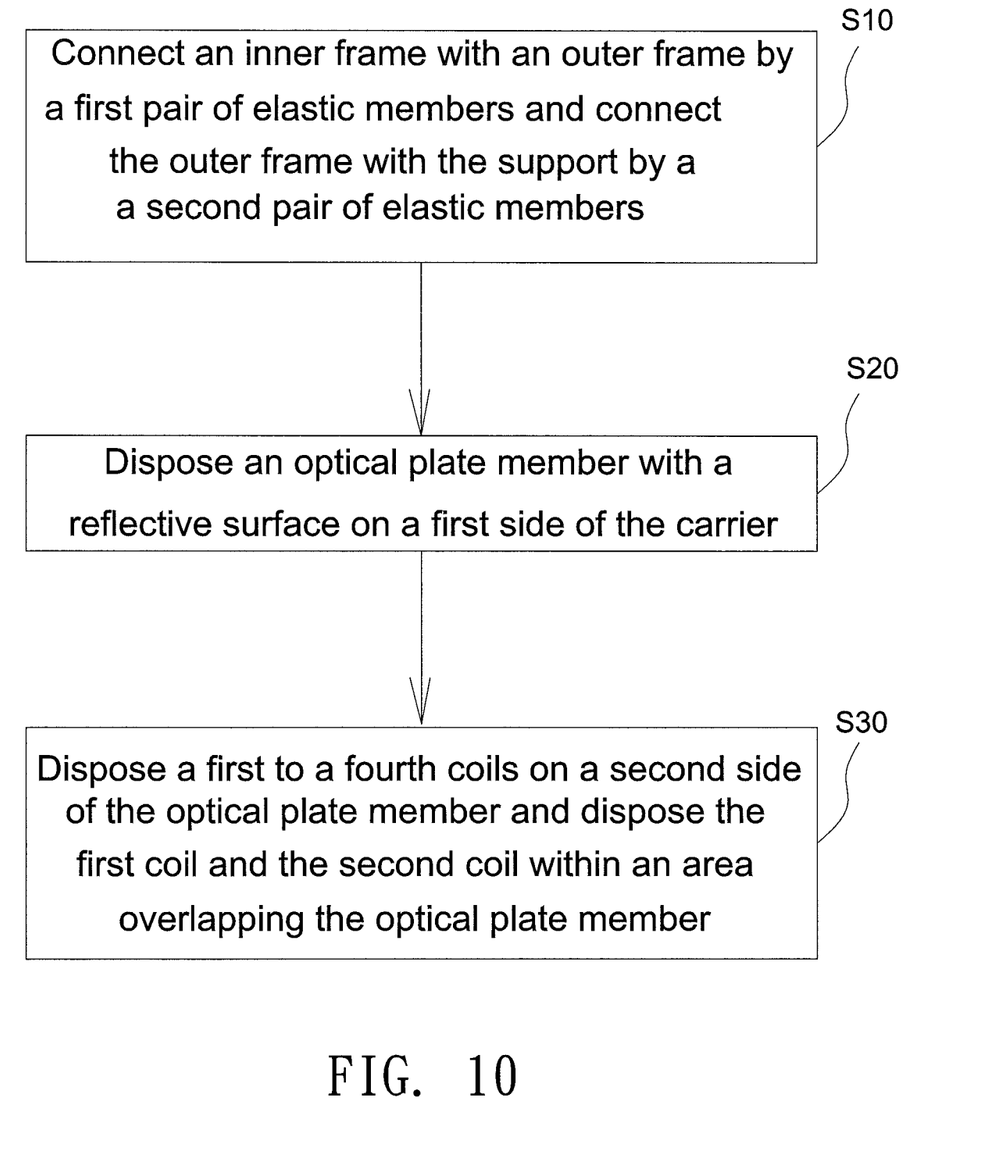
FIG. 10 shows a flow chart of a fabrication method of a light path adjustment mechanism according to an embodiment of the invention.

FIG. 10 shows a flow chart of a fabrication method of a light path adjustment mechanism according to an embodiment of the invention. The fabrication method may be applied to at least the light path adjustment mechanisms 100 and 200. In this embodiment, first, a carrier having an inner frame and an outer frame, a first pair of elastic members and a second pair of elastic members are provided, the first pair of elastic members connects the inner frame with the outer frame and defines a first axis, and the second pair of elastic members connects the outer frame with a support and defines a second axis (Step S10). The carrier has a first side and a second side opposite the first side, and an optical plate member with a reflective surface is disposed on the first side of the carrier (Step S20). A first coil, a second coil, a third coil and a fourth coil are disposed on the second side of the carrier, the optical plate member covers the first side of the carrier in an overlapping area, a corresponding area on the second side of the carrier coincides with the overlapping area, and the first coil and the second coil are disposed inside the corresponding area (Step S30).

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:
1. A light path adjustment mechanism, comprising:
   a carrier comprising an inner frame and an outer frame disposed outside the inner frame, and the carrier having a first side and a second side opposite the first side;
   a reflective minor disposed on the first side of the carrier;

a first coil, a second coil, a third coil and a fourth coil disposed on the second side of the carrier;
a support provided with at least two attachment points, and the carrier being attached to the support through the at least two attachment points;
a first pair of elastic members for connecting the inner frame with the outer frame and defining a first axis; and
a second pair of elastic members for connecting the outer frame with the support and defining a second axis, the reflective mirror covering the first side of the carrier in an overlapping area, a corresponding area on the second side of the carrier coinciding with the overlapping area, and the first coil and the second coil being disposed inside the corresponding area.

2. The light path adjustment mechanism as claimed in 1, further comprising:
a spacer disposed between the inner frame and the reflective minor.

3. The light path adjustment mechanism as claimed in 1, wherein the spacer comprises a pad or an adhesive.

4. The light path adjustment mechanism as claimed in 1, wherein the inner frame and the outer frame are located at the same height.

5. The light path adjustment mechanism as claimed in 1, wherein the inner frame and the outer frame lie in the same plane, and the outer frame surrounds the inner frame.

6. The light path adjustment mechanism as claimed in 1, wherein the first coil and the second coil are disposed on two opposite sides of the first pair of elastic members and overlap the inner frame, and the third coil and the fourth coil are disposed on two opposite sides of the second pair of elastic members and overlap the outer frame.

7. The light path adjustment mechanism as claimed in 1, further comprising:
a first permanent magnet, a second permanent magnet, a third permanent magnet and a fourth permanent magnet arranged corresponding to the first coil, the second coil, the third coil and the fourth coil.

8. The light path adjustment mechanism as claimed in 7, wherein the first permanent magnet and the second permanent magnet are disposed on the inner frame, and the third permanent magnet and the fourth permanent magnet are disposed on the outer frame.

9. The light path adjustment mechanism as claimed in 1, wherein the outer frame, the inner frame, the first pair of elastic members and the second pair of elastic members are integrally formed as one piece.

10. A light path adjustment mechanism, comprising:
a carrier comprising an inner frame and an outer frame disposed outside the inner frame;
an optical plate member disposed on the inner frame and having a reflective surface and an opposite surface opposite the reflective surface;
a support disposed outside the outer frame;
a first axis disposed between the inner frame and the outer frame;
a second axis disposed between the outer frame and the support; and
a first actuator and a second actuator disposed on one side of the carrier facing away from the reflective mirror, and the opposite surface of the reflective mirror being spaced at a distance from the first axis to allow the reflective surface of the reflective mirror to tilt about the first axis.

11. The light path adjustment mechanism as claimed in 10, wherein the first actuator enables the optical plate member to tilt about the first axis, and the second actuator enables the optical plate member to tilt about the second axis.

12. The light path adjustment mechanism as claimed in 10, further comprising:
at least one first permanent magnet arranged corresponding to the first actuator; and
at least one second permanent magnet arranged corresponding to the second actuator.

13. The light path adjustment mechanism as claimed in 10, wherein the first actuator overlaps the inner frame and comprises at least one coil, and the second actuator overlaps the outer frame and comprises at least one coil.

14. The light path adjustment mechanism as claimed in 10, wherein the first actuator comprises a first coil and a first spring respectively disposed on two sides of the first axis, and the second actuator comprises a second coil and a second spring respectively disposed on two sides of the second axis.

15. The light path adjustment mechanism as claimed in 10, wherein the first actuator is disposed on only one side of the first axis, and the second actuator is disposed on only one side of the second axis.

16. The light path adjustment mechanism as claimed in 10, further comprising:
a spacer disposed between the inner frame and the opposite surface of the reflective mirror.

17. The light path adjustment mechanism as claimed in 16, wherein the spacer comprises a pad or an adhesive.

18. The light path adjustment mechanism as claimed in 10, wherein the inner frame and the outer frame are located at the same height.

19. The light path adjustment mechanism as claimed in 10, wherein the inner frame and the outer frame lie in the same plane, and the outer frame surrounds the inner frame.

20. The light path adjustment mechanism as claimed in 10, wherein the outer frame, the inner frame, the first axis and the second axis are integrally formed as one piece.

* * * * *